Patented Dec. 9, 1952

2,621,172

UNITED STATES PATENT OFFICE 2,621,172

COMPOSITIONS OF MATTER FROM SULFUR CHLORIDES, BICYCLIC TERPENES, PHOSPHORUS SULFIDES, AND ALKYLATED PHENOLS OR ALCOHOLS

Ford C. Teeter, Chicago, Ill., assignor to Sinclair Refining Company, New York, N. Y., a corporation of Maine No Drawing. Application February 2, 1949, Serial No. 74,257

11 Claims. (Cl. 260—137)

This invention relates to the production of new compositions of matter by reaction of a sulfur chloride with a reaction product of a bicyclic terpene, a phosphorus sulfide, and an alkylated phenol or an alcohol. In one aspect, it provides a method for improving the odor of this latter type product, while in other aspects it provides new compounds having valuable properties as oxidation and bearing corrosion inhibitors in lubricating oils.

The reaction of the condensation product of a bicyclic terpene and phosphorus sulfide with an alkylated phenol, or with an alcohol, is productive of compounds that are highly useful as anti-corrosion agents in lubricating oils as employed in internal combustion engines. These compounds have been described in the U. S. Patents Nos. 2,379,312 and 2,409,878, to Robert L. May. However, this type reaction product is characterized by an objectionable garlic-like odor. Despite the improved properties of oils containing these compounds, this somewhat offensive physical property has limited the sales appeal in applications requiring considerable handling of the oils by workers. The cause of the odor is not entirely understood, but it develops in the reaction of the phenol or alcohol with the bicyclic terpene-phosphorus sulfide compound, for the latter compound itself is characterized by an odor more typical of sulfurized hydrocarbons.

Surprisingly, I have found that this objectionable odor can be substantially eliminated by reaction with a sulfur chloride. The product retains its former utility and, indeed, has useful properties in its own right, while the undesirable scent is replaced by what might be termed a pleasing pine odor. The products so formed contain phosphorus, a small amount of chlorine, and a relatively high proportion of sulfur.

The characteristics of the compounds of my present invention vary somewhat, depending upon the properties of the bicyclic terpene-phosphorus sulfide condensation product and the nature and proportions of the sulfur chloride and alkylated phenol, or the alcohol used. However, the compounds are relatively acidic without further treatment and are highly soluble in mineral oils. Generally, they are prepared by reacting initially a bicyclic terpene, for example, alpha-pinene, with a phosphorus sulfide, for example, phosphorus pentasulfide. This condensation product is then further reacted with an alkylated phenol or alcohol, and the resulting mixture is treated with a sulfur chloride. I use a bicyclic terpene, such as alpha-pinene or camphene, in the formation of the intermediate condensation products, since the monocyclic terpenes result in the production of oil-insoluble compositions.

In the preparation of the intermediate condensation product of, for example, alpha-pinene and phosphorus pentasulfide, the molar ratio of alpha-pinene to phosphorus pentasulfide employed with advantage is about 3 : 1. However, this ratio may vary somewhat in either direction. For instance, highly desirable condensation products result when the molar ratio of alpha-pinene to phosphorus pentasulfide is within the range of 5 : 2 to about 9 : 2.

The reaction of alpha-pinene with phosphorus pentasulfide is highly exothermic and proceeds spontaneously after being initiated by slight heating. A desirable method of effecting the reaction is to heat the alpha-pinene in a vessel to about 275° F., or slightly higher, and then, without further heating, slowly add the phosphorus pentasulfide in powdered form while maintaining agitation. The heat of the reaction is considerable, and consequently, the addition should be made slowly so as to avoid the possibility of the reaction becoming uncontrollable. In particular, a useful condensation product is prepared when the temperature during the admixture is not permitted to exceed about 275° F., although higher temperatures are permissible.

After the addition is completed, it is usually necessary to apply heat externally to complete the reaction. The temperature during this latter stage is preferably maintained at about 275° F., although thermal environments in the range of about 200–400° F. may be employed. The condensation product prepared in this manner is a viscous liquid at elevated temperatures, and solidifies upon cooling to room temperature.

To this mixture is gradually added an alkylated phenol or alcohol, advantageously at a temperature of about 275° F. The optimum temperature of the condensation product for the introduction of the phenol or alcohol will vary, depending upon the phenol or alcohol used. In particular, alkylated phenols are relatively stable towards heat, and they may be safely admixed with the condensation product at temperatures as high as 300° F. Very little heat is evolved upon the addition of the phenol, and after its addition the mixture is preferably maintained at an elevated temperature for a short period of time, although this is not necessary. The proportions of the alkylated phenol or alcohol to be added may be varied over a considerable range depending upon the particular characteristics of the product desired. The optimum proportion of the phenol or alcohol used is, to a considerable extent, dependent upon the ratio of alpha-pinene to phosphorus pentasulfide used in the preparation of the condensation product. Generally satisfactory results have been obtained employing an alkylated phenol or alcohol in the ratio of 0.5 : 2 to 3.0 : 2, based on the molar quantities of the phosphorus pentasulfide.

Due to the viscosity of this reaction product, it is highly preferable to add at this point a light neutral oil for ease of handling. In practice, the neutral oil addition should be of such an amount as to yield an oil concentrate containing about 3% phosphorus. Other inert solvents, e. g., chloroform or carbon tetrachloride, could of course be used, but an oil is favored for cost and because the products are generally most useful in the form of oil concentrates.

The final step in the production of these compositions is the addition of a sulfur chloride, preferably effected at a temperature of the reaction product (advantageously prepared as an oil concentrate) in the range of 100 to 120° F. This addition temperature of the sulfur chloride is dependent in part upon the particular chloride used. In particular, where the lower-boiling dichloride is employed, the temperature is advantageously maintained within these limits. Excessive temperatures also result in discoloration of the preparation and should be avoided for this reason. Accordingly, the sulfur chloride is added slowly to keep the temperature below about 120° F., and upon completion of the addition, the composition thus prepared may be further reacted at a temperature of about 200° F. for five or ten hours. However, in order to render preparation of these compositions more practicable, this final reaction period may be eliminated.

The proportions of the sulfur chloride employed may be varied over a wide range, depending upon the properties of the finished composition desired as well as upon the type of sulfur chloride added. Based upon the amount of phosphorus pentasulfide utilized, the addition of the sulfur chloride may preferably be in the range of 0.5 : 2 to 5.0 : 2.

A particularly satisfactory range of proportions of constituents to be used in preparing these compositions consists of reacting about 8 moles of alpha-pinene to about 2 moles of phosphorus pentasulfide to about 0.5 to 2.0 moles of an alkylated phenol or alcohol to about 0.5 to 5.0 moles of sulfur chloride.

The composition thus prepared is generally acidic and a neutralization treatment may be employed in order to eliminate the absorbed hydrogen chloride and the labile chlorine present. A particularly satisfactory neutralization treatment comprises heating these compositions to 200° F. for a period of about thirty to forty-five minutes, whereupon 1½ moles of calcium hydroxide are added for each mole of the sulfur chloride employed. This mixture is then heated for three hours at 200° F. while maintaining vigorous agitation. The finely suspended calcium compounds in the neutralized composition may be removed upon the addition of a filter aid and a subsequent filtration. However, other alkaline earth oxides and hydroxides, such as calcium oxide, barium oxide, and barium hydroxide, may be used. The optimum quantities of the neutralizing agent employed are dependent upon the acidic properties of the reaction product initially prepared.

Pure alpha-pinene is preferred in preparing these compositions; however, a reactant comprising substantially alpha-pinene in admixture with other related terpenes, such as camphenes and dipentenes, is satisfactory.

Exemplary of alkylated phenols that may be used are para-tertiary amyl phenol, para-cyclohexyl phenol, ditertiary amyl phenol, and di-secondary amyl phenol. As indicated above an alcohol may be used to replace all or part of the alkylated phenol in the compound, examples of which are 2-methyl pentanol, 2-ethyl butanol, and octanol-1. The alcohols are favored by cost considerations and, in part, by the circumstance that the relatively pleasing odor of some higher alcohols acts to some extent as a masking odor. In general, however, I find that the phenol-containing products are superior.

The sulfur chloride employed may be either the monochloride or the dichloride. However, I prefer and recommend sulfur dichloride because, inter alia, the absorbed hydrogen chloride and labile chlorine are more easily removed, thereby requiring a milder neutralization treatment.

The following specific examples of various members, and the procedure by which they can be successfully prepared, including neutralization treatments, are given as illustrative of the group of compounds I claim. The light petroleum lubricating oil fraction used as the diluent in the examples was a Mid-Continent conventionally-refined neutral having the characteristics set forth in Table I.

TABLE I

| | |
|---|---|
| Gravity °A. P. I | 27–28 |
| Flash point, °F | 355–360 |
| Fire point, °F | 410 |
| S. U. S. viscosity at: | |
| 100° F., secs | 105 |
| 130° F., secs | 65 |
| 210° F., secs | 39 |
| Viscosity index | 60–65 |
| Color | 2– |
| Pour point, °F | +15 |
| Carbon residue, percent | .01 |
| Acid number | .01 |
| Sulfur, percent | .50 |
| Aniline number | 83 |
| Specific dispersion | 132 |

*Example I*

544 gms. (4 moles) of alpha-pinene were added to a five-liter, three-necked flask equipped with a reflux condenser, stirrer, and thermometer. The alpha-pinene was heated to 275° F., whereupon 222 gms. (1 mole) of phosphorus pentasulfide were slowly added portionwise so as to maintain the temperature at 275° F. Upon completion of the addition, the mixture was heated for seven hours at 275° F., and then 164 gms. (1 mole) of para-tertiary amyl phenol were added and the resulting mixture heated for four hours at 275° F. The product was diluted with 1035 gms. of neutral oil so as to yield an oil concentrate containing an equivalent of, by weight, 11.3% phosphorus pentasulfide. The temperature was lowered to 100° F., and 11 gms. (0.1 mole) of sulfur dichloride were slowly added from a dropping funnel at a rate so as to maintain the temperature between 100 and 110° F. The addition of the sulfur dichloride required two hours. 10 gms. (0.18 mole) of calcium oxide were then contacted with the mixture for 0.5 hour at a temperature of 200° F., whereupon 2% filter aid was added and the mixture filtered. The finished product was slightly basic and analyzed by weight 0.2% chlorine, 3.28% phosphorus, 8.60% sulfur, and 0.018% calcium. However, this compound still had a garlic odor.

Examples II–X 544 gms. (4 moles) of alpha-pinene were added to a five-liter, three-necked flask, equipped with a reflux condenser, stirrer, and thermometer. The alpha-pinene was heated to 275° F., whereupon 222 gms. (1 mole) of phosphorus pentasulfide were slowly added portionwise so as to maintain the temperature at 275° F. Upon completion of the addition, the mixture was heated for seven hours at 275° F. and then 164 gms. (1 mole) of para-tertiary amyl phenol were added and the resulting mixture heated for four hours at 275° F. The product was diluted with 1035 gms. of neutral oil so as to yield an oil concentrate containing an equivalent of, by weight, 11.3% phosphorus pentasulfide. The temperature was lowered to 100° F. and 52 gms. (0.5 mole) of sulfur dichloride were slowly added from a dropping funnel at a rate so as to maintain the temperature between 100 and 115° F. The addition of the sulfur chloride required three hours.

Convenient amounts, about one third of a compound prepared in this manner, were then contacted with various neutralizing agents for different periods of time and at different temperatures. In each case 2% filter aid was added to the neutralized preparation and the mixture filtered. The individual treatments and the analyses of the different products thereby formed follow. Where there was an absence of acidity, each compound was found to be slightly basic, which is indicated as "S. B." in the examples.

The alpha-pinene was heated to 275° F. and 222 gms. (1 mole) of phosphorus pentasulfide were slowly added portionwise so as to maintain the temperature at 275° F. Upon completion of the addition, the mixture was heated for seven hours at 275° F., whereupon 164 gms. (1 mole) of para-tertiary amyl phenol were added and the resulting mixture heated for four hours at 275° F. The product was then diluted with 1035 gms. of neutral oil so as to yield an oil concentrate containing an equivalent of, by weight, 11.3% of phosphorus pentasulfide. The temperature was lowered to 100° F. and 77 gms. (0.75 mole) of sulfur dichloride were added over a period of four hours at such a rate as to maintain a temperature between 100 and 115° F. This compound was reacted for an additional five hours at 200° F. 35 gms. (.062 mole) of calcium oxide were then added and contacted therewith for 0.5 hour at 200° F., whereupon 2% filter aid was added and the mixture filtered. The finished product analyzed by weight 0.05% acidity as hydrogen chloride, 0.95% chlorine, 3.20% phosphorus, 9.78% sulfur, and 0.003% calcium, and possessed a pine odor.

Example XII 680 gms. (5 moles) of alpha-pinene were added to a five-liter, three-necked flask equipped with a reflux condenser, stirrer, and thermometer. The alpha-pinene was heated to 275° F. and 222 gms. (1 mole) of phosphorus pentasulfide were slowly added portionwise so as to maintain the temperature at 275° F. Upon completion of the addition, the mixture was heated for seven hours at 275° F., whereupon 164 gms. (1 mole) of para-tertiary amyl phenol were added and the resulting mixture heated for four hours at 275° F. The product was then diluted with 899 gms. of the neutral oil so as to yield an oil concentrate containing an equivalent of, by weight, 11.3% phosphorus pentasulfide. The temperature was then lowered to 100° F. and 258 gms. (2.5 moles) of sulfur dichloride were slowly added from the dropping funnel at a rate so as to maintain the

| Example | II | III | IV | V | VI |
|---|---|---|---|---|---|
| Neutralization Agent | CaO | CaO | CaO | Ca(OH)₂ | Ca(OH)₂ |
| Grams | 10 | 20 | 28 | 20 | 20 |
| Moles | 0.18 | 0.36 | 0.5 | 0.27 | 0.27 |
| Time, hrs | 3.5 | 5.0 | 5.0 | 1.0 | 2.0 |
| Temperature, °F | 250 | 250 | 200 | 200 | 200 |
| Acidity as Hydrogen Chloride, Wt. Percent | 0.06 | S. B. | S. B. | 0.003 | S. B. |
| Chlorine, Wt. Percent | 0.52 | 0.2 | 0.5 | 0.55 | 0.44 |
| Phosphorus, Wt. Percent | 3.08 | 3.24 | 3.28 | 2.64 | 2.64 |
| Sulfur, Wt. Percent | 9.29 | 9.29 | 9.30 | 9.28 | 9.25 |
| Calcium, Wt. Percent | 0.52 | 0.164 | 0.030 | 0.002 | 0.002 |
| Odor | Pine | Pine | Pine | Pine | Pine |

| Example | VII | VIII | IX | X |
|---|---|---|---|---|
| Neutralization Agent | Ca(OH)₂ | Ba(OH)₂·8H₂O | BaO | CaO |
| Grams | 20 | 53 | 26 | 10 |
| Moles | 0.27 | 0.17 | 0.17 | 0.18 |
| Time, hrs | 3.0 | 3.0 | 3.0 | 3.0 |
| Temperature, °F | 200 | 200 | 200 | 200 |
| Acidity as Hydrogen Chloride, Wt. Percent | 0.009 | 0.03 | 0.05 | 0.03 |
| Chlorine, Wt. Percent | 0.67 | 0.31 | 0.066 | 0.40 |
| Phosphorus, Wt. Percent | 2.72 | 2.76 | 2.74 | 2.78 |
| Sulfur, Wt. Percent | 9.19 | 8.58 | 4.33 | 9.26 |
| Calcium, Wt. Percent | 0.002 | | | 0.004 |
| Barium, Wt. Percent | | 0.843 | 0.060 | |
| Odor | Pine | Pine | Pine | Pine |

Example XI 544 gms. (4 moles) of alpha-pinene were added to a five-liter, three-necked flask equipped with a reflux condenser, stirrer, and thermometer.

temperature between 100 and 120° F. The addition of the sulfur dichloride required eight hours, whereupon the temperature was increased to 200° F. and so maintained for five hours. 100 gms.

(1.8 moles) of calcium oxide were then contacted with the mixture for 0.5 hour at a temperature of 200° F., whereupon 2% filter aid was added and the mixture filtered. The finished product analyzed by weight 0.07% acidity as hydrogen chloride, 2.80% chlorine, 3.26% phosphorus, 11.66% sulfur, and 0.03% calcium, and possessed a camphor odor. As the treatment time was short, free hydrogen chloride developed in the product and it was necessary to retreat it.

This product was retreated by addition of 100 gms. (1.8 moles) of calcium oxide. The treatment lasted for four hours at a temperature of 200° F. The reneutralized composition then analyzed by weight 0.04% acidity as hydrogen chloride, 2.54% chlorine, 3.26% phosphorus, 11.92% sulfur, and 0.00% calcium, and possessed a camphor odor.

Examples XIII–XV 544 gms. (4 moles) of alpha-pinene were added to a five-liter, three-necked flask, equipped with a reflux condenser, stirrer, and thermometer. The alpha-pinene was heated to 275° F., whereupon 222 gms. (1 mole) of phosphorus pentasulfide were slowly added portionwise so as to maintain the temperature at 275° F. Upon completion of the addition, the mixture was heated for seven hours at 275° F. 164 gms. (1 mole) of para-tertiary amyl phenol were then added and the resulting mixture heated for four hours at 275° F. The product was diluted with 1035 gms. of the neutral oil so as to yield an oil concentrate containing an equivalent of, by weight, 11.3% phosphorus pentasulfide. The temperature was then lowered to 100° F. and 31 gms. (0.3 mole) of sulfur dichloride were slowly added from a dropping funnel at a rate so as to maintain the temperature between 100 and 110° F.

Convenient amounts, about one third of a compound prepared in this manner, were then contacted with various amounts of calcium oxide and calcium hydroxide for three hours at 200° F. In each case 2% filter aid was added to the neutralized preparation and the mixture filtered. The individual neutralization agents employed and the analyses of the different products thus formed follow. Where there was an absence of acidity, each compound was found to be slightly basic, which is indicated as "S. B." in the examples.

| Example | XIII | XIV | XV |
|---|---|---|---|
| Neutralization Agent | CaO | CaO | Ca(OH)$_2$ |
| Grams | 6 | 11 | 15 |
| Moles | 0.1 | 0.2 | 0.2 |
| Acidity as Hydrogen Chloride, Wt. Percent | S. B. | S. B. | 0.10 |
| Chlorine, Wt. Percent | 0.3 | 0.5 | 1.20 |
| Phosphorus, Wt. Percent | 3.36 | 3.38 | 2.98 |
| Sulfur, Wt. Percent | 8.86 | 9.00 | 8.99 |
| Calcium, Wt. Percent | 0.003 | 0.32 | 0.00 |
| Odor | Pine | Pine | Pine |

Example XVI 1088 gms. (8 moles) of alpha-pinene were added to a five-liter, three-necked flask, equipped with a reflux condenser, stirrer, and thermometer. The alpha-pinene was heated to 275° F., whereupon 444 gms. (2 moles) of phosphorus pentasulfide were slowly added portionwise so as to maintain the temperature at 275° F. Upon completion of the addition, the mixture was heated for seven hours at 275° F., following which 256 gms. (1.56 moles) of para-tertiary amyl phenol were added and the resulting mixture heated for four hours at 275° F. Following the addition of the phenol, 19 gms. (0.19 mole) of 2-methyl pentanol were further added and the entire mixture heated for four additional hours at 275° F. The product was diluted with 2123 gms. of the neutral oil so as to yield an oil concentrate containing an equivalent of, by weight, 11.3% phosphorus pentasulfide. The temperature was lowered to 100° F. and 103 gms. (1 mole) of sulfur dichloride were slowly added from a dropping funnel at a rate so as to maintain the temperature between 100 and 120° F. The addition of the sulfur chloride required about three hours. 111 gms. (1.5 moles) of calcium hydroxide were then added, and contacted therewith for three hours at 200° F. 2% filter aid was added and the mixture filtered. The compound was slightly basic and analyzed by weight 0.62% chlorine, 3.14% phosphorus, 9.10% sulfur, and 0.00% calcium, had an acid number of 1.20 and an alcoholic-pine odor.

Example XVII 1088 gms. (8 moles) of alpha-pinene were added to a five-liter, three-necked flask, equipped with a reflux condenser, stirrer, and thermometer. The alpha-pinene was heated to 275° F., whereupon 444 gms. (2 moles) of phosphorus pentasulfide were slowly added portionwise so as to maintain the temperature at 275° F. Upon completion of the addition, the mixture was heated for seven hours at 275° F. and then 256 gms. (1.56 moles) of para-teritary amyl phenol were added and the resulting mixture heated for four hours at 275° F. The product was diluted with 2140 gms. of neutral oil so as to yield an oil concentrate containing an equivalent of, by weight, 11.3% phosphorus pentasulfide. The temperature was lowered to 100° F., and 103 gms. (1 mole) of sulfur dichloride were slowly added from a dropping funnel at a rate so as to maintain the temperature between 100 and 120° F. The addition of the sulfur chloride required about three hours. 111 gms. (1.5 moles) of calcium hydroxide were then added and contacted therewith for three hours at 200° F. 2% filter aid was added and the mixture filtered. The compound was slightly basic and analyzed by weight 0.5% chlorine, 3.18% phosphorus, 9.04% sulfur, and 0.00% calcium, had an acid number of 0.95 and possessed a pine odor.

Example XVIII 544 gms. (4 moles) of alpha-pinene were added to a five-liter, three-necked flask, equipped with a reflux condenser, stirrer, and thermometer. The alpha-pinene was heated to 275° F., whereupon 222 gms. (1 mole) of phosphorus pentasulfide were slowly added portionwise so as to maintain the temperature at 275° F. Upon completion of the addition, the mixture was heated for seven hours at 275° F. and 164 gms. (1 mole) of para-tertiary amyl phenol were added, the resulting mixture being heated for four hours at 275° F. The product was diluted with 1035 gms. of neutral oil so as to yield an oil concentrate containing an equivalent of, by weight, 11.3% phosphorus pentasulfide. The temperature was lowered to 100° F. and 68 gms. (0.5 mole) of sulfur monochloride were slowly added from a dropping funnel at a rate so as to maintain the temperature between 100 and 115° F. The addition of the sulfur monochloride required about three hours. 37 gms. (0.5 mole) of calcium hydroxide were then added. After contacting for three hours at 200°

F., 2% filter aid was added and the mixture filtered. This compound contained an appreciable amount of hydrogen chloride and hence retreatment was necessary. Accordingly, the treated product was divided into two parts. To one part were added 19 gms. (0.25 mole) of calcium hydroxide and contacted therewith for three hours at 200° F. This composition analyzed by weight 0.07% acidity as hydrogen chloride, 0.87% chlorine, 3.40% phosphorus, and 9.85% sulfur, and possessed a pine odor. The remaining one-half was treated in an identical manner except that the contact temperature was 250° F. This composition was slightly basic and analyzed by weight 0.43% chlorine, 3.54% phosphorus, 9.92% sulfur, and 0.124% calcium, and also possessed a pine odor.

I claim:

1. A composition of matter prepared by the reaction of about 0.5 to 5.0 moles of a sulfur chloride with a reaction product of about 5 to 9 moles of a bicyclic terpene, about 2 moles of a phosphorus sulfide, and about 0.5 to 3.0 moles of a compound selected from the class consisting of alkylated phenols and alcohols.

2. A composition of matter prepared by the reaction of about 0.5 to 5.0 moles of a sulfur chloride with a reaction product of about 5 to 9 moles of alpha-pinene, about 2 moles of phosphorus pentasulfide, and about 0.5 to 3.0 moles of a compound selected from the class consisting of alkylated phenols and alcohols.

3. A composition of matter prepared by the reaction of about 0.5 to 5.0 moles of a sulfur chloride with the reaction product of about 5 to 9 moles of alpha-pinene, about 2 moles of phosphorus pentasulfide, and about 0.5 to 3.0 moles of an alkylated phenol.

4. A composition of matter prepared by the reaction of about 0.5 to 5.0 moles of a sulfur chloride with the reaction product of about 5 to 9 moles of alpha-pinene, about 2 moles of phosphorus pentasulfide, and about 0.5 to 3.0 moles of an alcohol.

5. A composition of matter prepared by the reaction of about 0.5 to 5.0 moles of sulfur dichloride with the reaction product of about 5 to 9 moles of alpha-pinene, about 2 moles of phosphorus pentasulfide, and about 0.5 to 3.0 moles of a compound selected from the class consisting of alkylated phenols and alcohols.

6. In the production of reaction products of 5 to 9 moles of a bicyclic terpene with 2 moles of phosphorus pentasulfide which have been further reacted with 0.5 to 3.0 moles of a compound selected from the class consisting of alkylated phenols and alcohols, the improvement which consists of reacting said reaction products with a sulfur chloride in an amount of about 0.5 to 5.0 moles to about each 2 moles of the phosphorus pentasulfide.

7. In the production of reaction products of 5 to 9 moles of alpha-pinene with 2 moles of phosphorus pentasulfide which have been further reacted with 0.5 to 3.0 moles of a compound selected from the class consisting of alkylated phenols and alcohols, the improvement which consists of reacting said reaction products with a sulfur chloride in an amount of about 0.5 to 5.0 moles to about each 2 moles of the phosphorus pentasulfide.

8. In the production of reaction products of 5 to 9 moles of a bicyclic terpene with 2 moles of a phosphorus sulfide which have been further reacted with 0.5 to 3.0 moles of a compound selected from the class consisting of alkylated phenols and alcohols, the improvement which consists of reacting said reaction products with a sulfur chloride in an amount of about 0.5 to 5.0 moles to about each 2 moles of the phosphorus sulfide, and neutralizing the sulfur chloride-reacted product with an alkaline earth base.

9. In the production of reaction products of 5 to 9 moles of alpha-pinene with 2 moles of phosphorus pentasulfide which have been further reacted with 0.5 to 3.0 moles of a compound selected from the class consisting of alkylated phenols and alcohols, the improvement which consists of reacting said reaction products with a sulfur chloride in an amount of about 0.5 to 5.0 moles to about each 2 moles of the phosphorus pentasulfide, and neutralizing the sulfur chloride-reacted product with an alkaline earth base.

10. The method which comprises reacting 5 to 9 moles of a bicyclic terpene with 2 moles of a phosphorus sulfide, further reacting the product thus formed with 0.5 to 3.0 moles of a compound selected from the class consisting of alkylated phenols and alcohols, and then reacting said product with an amount of about 0.5 to 5.0 moles of a sulphur chloride in the presence of an inert solvent, finally neutralizing the reaction mixture with an alkaline earth base and filtering off the inorganic matter.

11. The method which comprises reacting 5 to 9 moles of alpha-pinene with 2 moles of phosphorus pentasulfide, further reacting the product thus formed with 0.5 to 3.0 moles of a compound selected from the class consisting of alkylated phenols and alcohols, and then reacting said product with an amount of about 0.5 to 5.0 moles of a sulfur chloride in the presence of an inert solvent, finally neutralizing the reaction mixture with an alkaline earth base and filtering off the inorganic matter.

FORD C. TEETER.

REFERENCES CITED

The following references are of record in the file of this patent:

UNITED STATES PATENTS

| Number | Name | Date |
| --- | --- | --- |
| 1,926,648 | Powers | Sept. 12, 1933 |
| 2,356,073 | May | Aug. 15, 1944 |
| 2,356,074 | May | Aug. 15, 1944 |
| 2,379,312 | May | June 26, 1945 |
| 2,379,313 | May | June 26, 1945 |
| 2,405,608 | Rogers | Aug. 13, 1946 |
| 2,422,275 | Winning et al. | June 17, 1947 |